Figure 1:
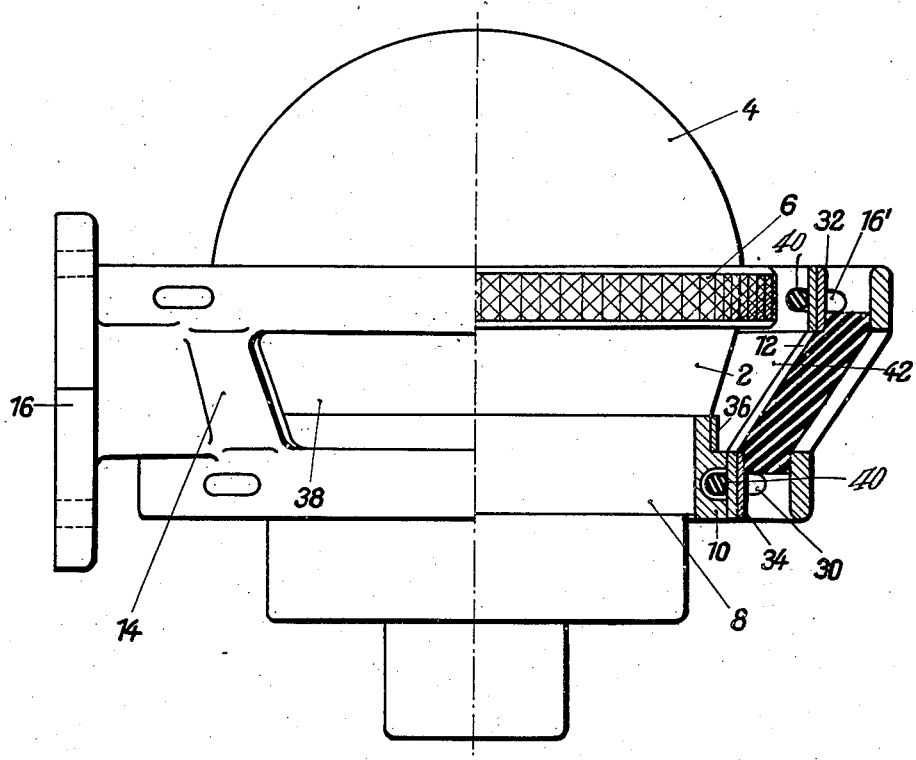

Aug. 17, 1937.    A. ZIMMERMANN    2,090,564
SUSPENSION FOR COMPASSES AND OTHER INSTRUMENTS
Filed Sept. 5, 1934    2 Sheets-Sheet 1

Inventor.
August Zimmermann
by Edward H. Palmer
Atty.

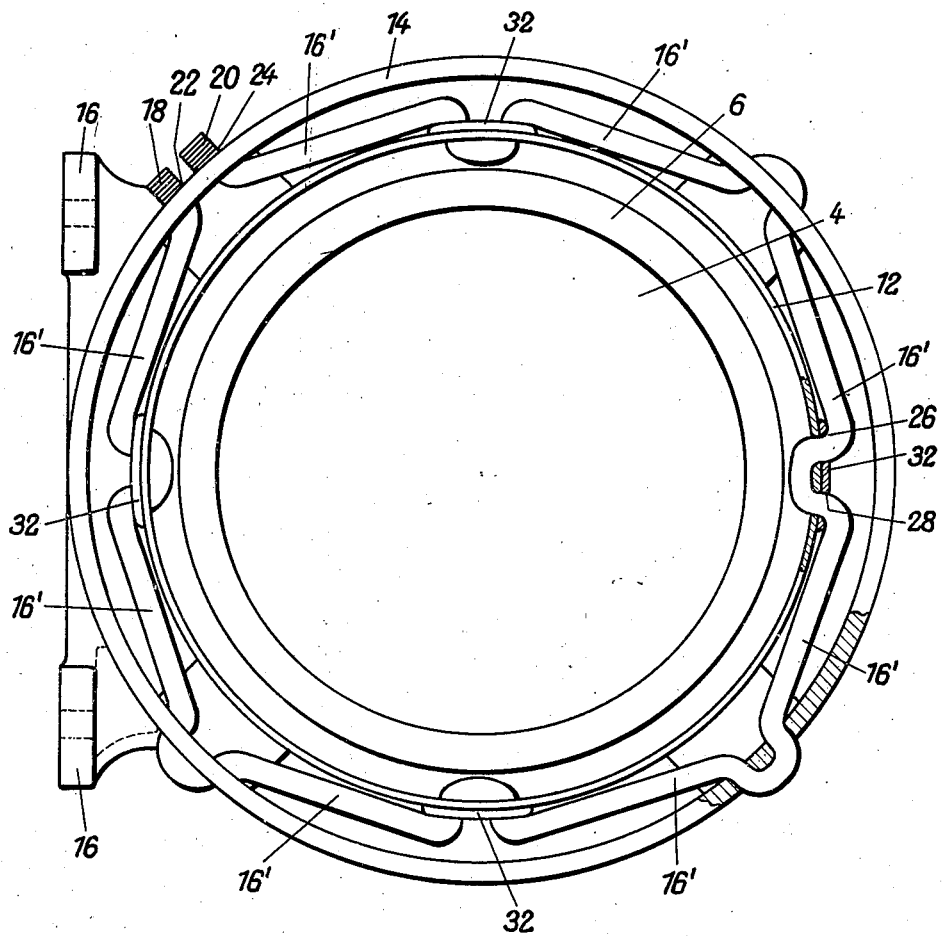

Patented Aug. 17, 1937

2,090,564

UNITED STATES PATENT OFFICE 2,090,564

SUSPENSION FOR COMPASSES AND OTHER INSTRUMENTS

August Zimmermann, Berlin-Steglitz, Germany, assignor to Askania-Werke A. G. vormals Centralwerkstatt-Dessau und Carl Bamberg-Friedenau, a corporation of Germany Application September 5, 1934, Serial No. 742,795 In Germany September 18, 1933

7 Claims. (Cl. 248—358)

This invention relates to compasses and other instruments, used more particularly in aircraft, and one of the objects of the invention is to provide a mounting or suspension for such instruments which shall protect them from vibrations, more particularly those of periodicity and high frequency.

This and other objects and aims of the invention will be readily understood from the following description, taken in connection with the accompanying drawings of one embodiment of the invention herein given for illustrative purposes, the true scope of the invention being more particularly pointed out in the appended claims.

In the drawings;

Fig. 1 is a partly diagrammatic lateral elevation of one illustrative embodiment of the invention, certain parts being shown in section, and Fig. 2 is a partly diagrammatic top plan view of the illustrative embodiment of the invention shown in Fig. 1, certain parts being shown in section.

An illustrative embodiment of the invention will now be described in its application to compasses, but it will be understood that the invention is equally applicable to other sensitive instruments for use more particularly in aircraft, such as rate of climb indicators etc.

Referring to the drawings, 2 is the compass bowl which is closed by a dome-shaped glass cover 4. At the junction of said bowl and cover a ring 6 provides a tight closure between said bowl and cover. Said bowl is provided at its base with a cylindrical extension 8 upon which is firmly clamped a clamping ring 10.

Supporting means is provided for the instrument, said means herein illustratively comprising an inner supporting member 12, herein a ring of general conical cross section and screwed or otherwise firmly secured to said ring 10, as clearly shown in Fig. 1. Surrounding said inner member 12 there is provided an outer, similar supporting member 14 which, in accordance with the invention, will preferably also be of general conical cross section. Said outer member 14 may be rigidly secured in any suitable manner to a bracket 16 or may be integral with the latter, said bracket being adapted to be secured to the instrument board or other suitable conveniently situated fixed portion of the aircraft.

The invention contemplates the provision of means to absorb or damp vibrations which may be caused by shocks or vibrations to which the compass or other instrument may be subjected, more particularly from the outside. It is well known that the vibrations engendered in aircraft have a disturbing, injurious action upon compasses, rate of climb indicators and other sensitive instruments used with aircraft, in that the instrument is thereby subjected to vibrations or oscillations which keep the indicating means of said instrument, the needle of a compass for example, in a state of unrest by causing it to oscillate. This results in false indications and readings and may even cause damage to the instrument. The present invention aims to protect the instrument from such vibrations, thus obviating the objections referred to and ensuring correct indications or readings. Preferably said vibration absorbing or damping means will be provided between said inner member 12 and said outer member 14, and will preferably comprise a plurality of resilient devices 16' disposed circumferentially of said inner member 12 and at an angle to the radii of said member. To this end said devices 16' are secured at their opposite ends to said member 12 and said member 14 respectively, the points at which they are secured to one of said members being staggered relatively to the points at which they are secured to the other of said members. Herein said resilient devices conveniently comprise a plurality of sections of a band or cord of rubber or other resilient material, which having its two free ends 18 and 20 secured in adjacent openings 22 and 24 in one of said members, member 14 for example, extends about said member 12 passing through sets of two adjacent openings 26 and 28 provided alternately in the one and the other of said members 12 and 14. The points of connection of said resilient means or devices to said member 14 and to the instrument respectively being thus laterally spaced from each other about the instrument. It will be noted therefore that said sections 16' are disposed or extend obliquely between said two members 12 and 14. This angular or oblique arrangement of said resilient devices or sections 16' enables them to be made of a sufficient size or length to ensure an efficient damping action which shall suffice to protect the instrument from the injurious vibrations above referred to, and this without increasing the size of the instrument, as would be necessary were said resilient devices or sections 16' disposed radially. If said resilient devices or sections were disposed radially of said members 12 and 14, it would be necessary in order effectively to meet the requirements that they be so long as to entail an increase in the transverse diameter of the instrument that would so increase its bulk as to render it impracticable, particularly for aircraft where a saving in both weight and space is important. Radially disposed resilient devices or sections sufficiently short to keep the bulk of the instrument within practicable limits would not suffice to secure the desired results.

Said resilient band or cord of rubber may be secured to said members 14 and 12 in any suitable manner but the manner of securing herein used as above set forth is simple and has the advantage that where said band passes through the two adjacent openings, said band forms a sharp almost rectangular kink, thus preventing any displacement of the compass relatively to said band and ensuring that the compass when once placed in correct position on the aircraft shall retain said position.

Preferably two damping or vibration absorbing means will be used, and these will preferably be located in different horizontal planes. This is shown in Fig. 1 wherein a second rubber band 30 is illustrated in a plane below that of the rubber band 16'. Said second band 30 may, and preferably is similar to said band 16' and may be secured to said members 14 and 12 in the same manner, its function being the same as that of said band 16'. It will be noted however that its sections are shorter than those of band 16' as it is connected to the part of less diameter of said two conical members 12 and 14. It will be apparent that a spring could be used in place of said rubber band. Preferably reinforcing means, such as plates 32 and 34 will be used where said perforations 26 and 28 are provided in the members 12 and 14.

A graduated ring 36 for compensating the error "A" may be provided upon the clamping ring 10, and said members 12 and 14 will preferably be provided with openings 38 for the observation and adjustment of said graduated ring 36.

It will be seen that the compass in the member 12 is held in suspension by the damping or vibration absorbing means, herein illustratively comprising the resilient elements or sections 16'.

The effective characteristics of said damping or vibration eliminating means, that is to say the length strength and initial tension, and so forth of the resilient bands or cords in the illustrative embodiment of the invention described, will preferably be so selected and predetermined that the natural frequency of the suspended compass or other system relatively to the upper damping means or band and to the lower damping means or band respectively, shall bear such a relation to each other that resonance oscillations or vibrations cannot occur. In this way all vibrations will be eliminated, any vibrations produced by a shock and that might penetrate through one of said damping means or bands, will inevitably be damped or eliminated by the other damping means or band. In the illustrative embodiment of the invention described this result may be secured by making both bands initially of the same strength and preliminary tension while making the sections of said bands of different lengths. This is conveniently effected in the illustrative embodiment of the invention described, by the conical shape of said two members 12 and 14, the sections 40 of one of said bands, band 30 for example, being thus shorter than those of the other band, band 16'.

Preferably also the effective characteristics of said damping means or bands, which determine the natural frequency of the suspended system relatively to said damping means, will be so selected and predetermined in respect to the frequency range of the motor and other parts of the aircraft that vibrate therewith, that the instrument can not be subjected to any noticeable vibrations resulting therefrom.

In certain cases, as when the instrument is likely to be exposed to very heavy vibrations, it may be desirable to provide further damping means. Such additional damping means may conveniently consist for example of a damping layer 42 of sponge rubber or the like, mounted between said two members 12 and 14.

The conical cross sectional shape of said members 12 and 14 and the provision of the two damping means in different, relatively widely spaced horizontal planes, also prevents tipping of the compass.

I am aware that the invention may be embodied in other specific forms without departing from the spirit or essential attributes thereof, and I therefore desire the present embodiment of the invention to be considered in all respects as illustrative and not restrictive, reference being had to the appended claims rather than to the foregoing description to indicate the scope of the invention.

I claim:

1. Suspension for compasses and other instruments, more particularly for aircraft, comprising, in combination, an instrument supporting ring and a second ring surrounding said first named ring, each of said rings being provided with a plurality of perforations disposed in pairs, the pairs of perforations in one ring being in staggered relation to the pairs of perforations in the other ring; and a flexible resilient member threaded through the perforations of said rings.

2. Suspension for compasses and other instruments, more particularly for aircraft, comprising, in combination, an instrument supporting ring and a second ring surrounding the same, each of said rings provided with a plurality of perforations disposed in pairs, the pairs of perforations in one ring being in staggered relation to the pairs of perforations in the other ring; and a rubber band threaded through the perforations of said rings.

3. A suspension for compasses or other instruments, comprising a ring carried by and surrounding the instrument; a second ring surrounding said first-mentioned ring and spaced therefrom, said second ring being adapted to be secured in fixed position; resilient members and means to connect said resilient members to the said rings, the points of connection of said resilient members to said two rings respectively being laterally spaced from each other about the instrument.

4. A suspension for compasses or other instruments comprising a ring carried by and surrounding the instrument; a second ring surrounding and spaced from said first-mentioned ring and adapted to be secured in fixed position; resilient members disposed in two substantially horizontal planes; and means to connect said resilient members to the said rings, the points of connection of said resilient members to said two rings respectively being laterally spaced from each other about the instrument.

5. A suspension for compasses or other instruments comprising a ring of substantially conical cross section carried by and encircling the instrument; a second fixed ring of substantially conical cross section surrounding and spaced from said first-mentioned ring; resilient members disposed in two substantially horizontal planes; and means to connect said resilient members to said rings, the points of connection of said resilient members to said two rings respectively being laterally spaced from each other about the instrument, and said resilient members in one plane being of different length from said resilient members in the other plane.

6. A suspension for compasses or other instruments comprising an interior annular support for the instrument carried by and surrounding the latter; and an exterior support surrounding said interior support and adapted to be secured in fixed position, each of said supports being provided in two substantially horizontal planes with a plurality of perforations disposed in pairs, the pairs of perforations in each plane in said interior support being arranged in staggered relation to the pairs of perforations in the same plane in said exterior support; and a rubber band threaded through the perforations of said supports in each plane.

7. A suspension for compasses or other instruments comprising an interior annular, ring shaped support of substantially conical cross section carrying and surrounding the instrument; an exterior ring shaped support of substantially conical cross section surrounding said interior support and adapted to be secured in fixed position, each of said supports being provided in two substantially horizontal planes with a plurality of perforations disposed in pairs, the perforations in each plane in said interior support being arranged in staggered relation to the pairs of perforations in the same plane in said exterior support; a rubber band threaded through the perforations of said supports in each plane, the portions of the rubber band extending between the perforations of said supports in one plane being shorter than the portions of the rubber band extending between the perforations of said supports in the other plane; and a layer of porous resilient material between said interior and exterior supports.

AUGUST ZIMMERMANN.